US008688162B1

(12) United States Patent
Shah et al.

(10) Patent No.: US 8,688,162 B1
(45) Date of Patent: Apr. 1, 2014

(54) METHOD AND DEVICE FOR REDUCING LATENCY BY ANTICIPATING RESPONSIVE DATA COMMUNICATIONS

(75) Inventors: Maulik K. Shah, Overland Park, KS (US); Siddharth Oroskar, Overland Park, KS (US); Srikanth Pulugurta, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 769 days.

(21) Appl. No.: 12/709,601

(22) Filed: Feb. 22, 2010

(51) Int. Cl.
*H04B 7/00* (2006.01)

(52) U.S. Cl.
USPC ........... 455/519; 455/434; 455/445; 455/517; 455/518; 455/414.1; 370/218; 370/328; 370/338; 370/349; 370/461

(58) Field of Classification Search
USPC .............. 455/519, 434, 445, 517, 518, 414.1, 455/414.2, 466; 370/218, 328, 329, 345, 370/338, 349, 347, 352, 395.2, 445, 447, 370/461
See application file for complete search history.

(56) References Cited

U.S. PATENT DOCUMENTS

| | | | |
|---|---|---|---|
| 6,081,715 A * | 6/2000 | La Porta et al. ............... | 455/445 |
| 6,522,660 B1 * | 2/2003 | Mukaihara et al. ........... | 370/443 |
| 7,020,098 B2 * | 3/2006 | Ehrsam et al. ................ | 370/260 |
| 7,158,806 B2 | 1/2007 | Harris et al. | |
| 7,170,872 B2 * | 1/2007 | Uskela .......................... | 370/332 |
| 8,107,988 B1 * | 1/2012 | Shetty et al. .................. | 455/522 |
| 8,364,192 B2 * | 1/2013 | Ghaus et al. .................. | 455/519 |
| 2004/0054560 A1 * | 3/2004 | Levionnais et al. ............... | 705/5 |
| 2004/0139199 A1 * | 7/2004 | Ando et al. .................... | 709/227 |
| 2004/0242252 A1 * | 12/2004 | Hoeben ......................... | 455/503 |
| 2006/0146696 A1 * | 7/2006 | Li et al. ......................... | 370/218 |
| 2008/0207233 A1 * | 8/2008 | Waytena et al. .............. | 455/466 |
| 2009/0077237 A1 * | 3/2009 | Brehon et al. ................ | 709/226 |
| 2009/0080450 A1 * | 3/2009 | Xiao et al. .................... | 370/410 |
| 2009/0285380 A1 * | 11/2009 | Chen et al. ............... | 379/210.01 |

OTHER PUBLICATIONS

Brin, Jason, et al., U.S. Appl. No. 10/356,310, filed Jan. 30, 2003.

* cited by examiner

*Primary Examiner* — Khai M Nguyen

(57) ABSTRACT

A method and system for reducing latency by anticipating responsive data communications is described. When the user of a first mobile station receives a message sent from a second mobile station, the user of the first mobile station may responsively reply. If, before the reply is sent, the second mobile station releases its network radio link and goes dormant, the reply may be delayed as the radio link is set up again after the reply is sent. To reduce this latency, the first mobile station may monitor its user's actions and, upon an indication that the user intends to soon reply to the earlier received message, the first mobile station may send a signal into the network which causes the second mobile station to maintain its radio link or to set up a new radio link if it has gone dormant.

17 Claims, 6 Drawing Sheets

METHOD AND DEVICE FOR REDUCING LATENCY BY ANTICIPATING RESPONSIVE DATA COMMUNICATIONS

BACKGROUND

In wireless communication systems, particularly cellular radio communication systems, mobile stations operating on a network may communicate via an air interface with a base transceiver station (BTS) and in turn with a base station controller (BSC). The BSC may also be coupled with a mobile switching center (MSC). Further, the BSC may be coupled with packet data serving element (PDSN) or other gateway, which may provide connectivity with an IP network, such as the public Internet or a private intranet (e.g., a wireless carrier's core IP network). The mobile station may thus communicate with entities on the IP network via a communication path comprising the air interface, the BTS, the BSC and the PDSN.

A properly equipped mobile station can initiate packet-data communication by sending a packet-data origination request message over an air interface access channel, and via the BSC, to the MSC. Applying industry standards, the origination request message may include a "packet data" service option code that characterizes the requested communication as packet-data communication, as compared with traditional voice communication. When the MSC receives the origination request, it may then detect the "packet data" service option code and responsively send the message back to the BSC for handling. (Note that, commonly, the MSC and BSC may be physically co-located and perhaps integrated in a common entity, sometimes referred to as an MSC/BSC or simply "switch.")

In turn, when the BSC receives an origination request, the BSC may establish a radio link layer connection with the mobile station by assigning the mobile station to operate on a particular traffic channel over the air interface (e.g., a fundamental traffic channel, and perhaps one or more supplemental channels). In addition, the BSC may pass the origination request to the PDSN. The PDSN and mobile station may then negotiate with each other to establish a data-link layer connection, typically a point-to-point protocol (PPP) session over which packet data can be communicated between the mobile station and the PDSN. As part of this process, the mobile station may obtain an IP address, to facilitate packet communications. For instance, the PDSN may assign an IP address to the mobile station, or the PDSN may communicate with a mobile-IP "home agent" to obtain an IP address for mobile station. (Note that it may also be possible for a mobile station to engage more directly in packet-switched communications, rather than communicating packet data through a channelized PPP connection. For instance, the BSC itself might sit as a element on an IP network, and the mobile station might send and receive individual packets via the BSC.)

In most wireless communication systems like this, the radio-link layer connection with a mobile station may time-out after a predefined period of inactivity. For instance, after 10 seconds in which no data is communicated to or from the mobile station over the air interface, the BSC or the mobile station may "tear-down" the radio-link layer connection by releasing the traffic channel that had been assigned to the mobile station. At the same time, however, the data-link layer (e.g., PPP) connection with the mobile station might remain.

Once the radio-link layer connection with a mobile station has timed out, the mobile station will be considered "dormant." However, if its data-link layer connection still exists, the mobile station may still seek to send packet data to other entities, and other entities may seek to send packet data to the mobile station. When another entity seeks to send packet data to the mobile station, the BSC may page the mobile station over an air interface paging channel. When a dormant mobile station receives a page indicative of an incoming data communication, or if the dormant mobile station seeks to send data, the radio link layer connection with the mobile station will need to be reestablished. To do so, the mobile station may send a message to the BSC over the access channel, requesting radio-link resources, and the BSC may then assign a traffic channel. The mobile station may then send or receive packet data over that traffic channel.

Some mobile stations may be equipped to automatically enter into an "always-on" data session upon power up, so as to provide IP network connectivity similar to that available through today's broadband landline modems. In particular, such a mobile station may be programmed to automatically send a "packet data" origination request upon power up and to then negotiate with the PDSN to establish a PPP session. After an initial period of inactivity, the radio-link layer connection with the mobile station may time-out. But, as indicated above, the mobile station may then acquire a radio-link connection when desired.

A mobile station that lacks both a radio-link and a data-link is considered to be in an "idle" state, contrasted with a "dormant" state. In the idle state, in order for the mobile station to engage in packet-data communication, it may conventionally send a packet data origination request in the manner described above.

Using packet-based communications, a mobile station may participate in data communications with other mobile stations operating on the wireless communication network via a variety of communication options and protocols. For examples, a mobile station may send and receive short messaging service (SMS) messages. As defined by TIA/EIA 637-A and/or other industry standards, a short messaging service center (SMSC) may operate on the wireless communication system network to receive, store and forward short messaging service messages to SMS-capable mobile stations. Additional communications options and protocols are possible as well, such as multimedia messaging service (MMS) messages, Real Time Protocol (RTP) communications, and e-mail messaging.

OVERVIEW

It is not uncommon for users of mobile stations on a wireless network to have responsive data communications with each other. For example, one user may use a mobile station to send a communication, such as an SMS message, to another user's mobile station and that other user may then responsively reply to the SMS message (and this cycle may continue repeatedly). This messaging cycle may occur quite rapidly and preferably with low latency. However, if the responding user delays in sending a reply message beyond the radio link timeout limit of the original sender's mobile station, the original sender's mobile station may go dormant in the intervening time. The acquisition of a radio link for a dormant mobile station takes time to complete and conventionally occurs only after data is being sent to the mobile station. In the context of a responsive SMS message exchange, that means that the targeted, but dormant, mobile station will begin reacquiring a radio link only after a responsive SMS message has reached the targeted mobile station's BSC or MSC and the BSC subsequently notifies the mobile station. Consequently, there is an increase in communication latency as the targeted mobile station goes through a wake-up period in which it reestablishes a communication link with the BSC, such as a radio link layer connection, in order to receive the responsive SMS message. A period of several seconds can pass until the responsive communication is ultimately received and displayed to the user.

An exemplary embodiment of the present invention provides a mechanism for reducing latency for responsive data communications between mobile stations. The invention provides a means of predictively reserving a radio link for the mobile station that is being responded to, thereby either preventing the mobile station from going dormant or allowing the mobile station to begin waking up before a user actually sends a responsive communication to the mobile station.

From this point forward, for the sake of convention, a mobile station that has received a message and is being used to prepare a responsive message will be referred to as the first mobile station. The corresponding user of the mobile station will be referred to as the first user. A mobile station that is both the sender of the original message and the intended target of the responsive message will be referred to as the second mobile station, and the corresponding user will be the second user. Also, although SMS messaging is used as a primary example, the invention applies with equal effect to other responsive communication schemes such as MMS, RTP, and e-mail exchanges.

In an exemplary embodiment of the invention, the first mobile station may predict when its user is going to send a responsive user-generated message and then, prior to the user sending the responsive message, the first mobile station may send a signal into the wireless communication network to notify the network to wake up the second mobile station and/or to cause the second mobile station to not go dormant. To predict a responsive message, the first mobile station may monitor user activity on the first mobile station for an indication that the first user is likely to soon instruct the mobile station to send a responsive message to the second mobile station. For example, if the first mobile station employs an SMS software application in which a user would conventionally press a "REPLY" button to begin composing a response to a previously received SMS message, the first mobile station may monitor the SMS software for the "REPLY" button-press action. Once the button-press has occurred, but before the user directs the first mobile station to send the responsive message, the first mobile station may send a reservation message to a communication server in the wireless communication network. The communication server may be a BSC, an MSC, a switch, an SMSC, or some other network element or combination of elements communicatively coupled to the wireless communication network. Transmission of the reservation message would preferably be invisible to the user of the first mobile station—i.e., a conventional user would not be aware that the reservation message had been sent—and the transmission would not interrupt the user's continued composition of the responsive message.

Upon receiving the reservation message, the communication server may then responsively send a message to the second mobile station or to a switch serving the second mobile station, which will ultimately cause the second mobile station to acquire a radio link and, if the mobile is in an idle state, to acquire a data link. The radio link may then be maintained for some set period of time.

This process can conveniently rely on existing technology, according to which a dormant second mobile station will be awakened when its serving switch has packet data to deliver to the mobile. For instance, according to an exemplary embodiment of the invention, the communication server, in response to receipt of a reservation message from a first mobile station, may cause an industry standard PING or other generic data to be sent to the second mobile station. For example, the communication server may instruct the terminating switch (i.e., the switch through which the second mobile station would normally establish a radio link) to page the second mobile station and the second mobile station would responsively request and acquire a radio link.

Alternatively, the process can involve more advanced signaling and intelligence. For example, in response to receipt of a reservation message, the communication server could send an SMS message to the second mobile station, and the SMS message could cause the second mobile station to acquire a radio link. For example, this could be a WAP Push type message. The SMS message would preferably be invisible to the user of the second mobile station; i.e., a conventional user would not be aware that the SMS message had been received. This process could also cause a second mobile station that is in an idle state, and not just dormant, to acquire a radio link and data link. Further, the SMS message could alternatively or additionally cause the second mobile station to not go dormant and to instead maintain any current and active packet-data connection. Additionally, the SMS message could instruct the second mobile station to maintain the radio link for at least a fixed period of time.

As another example, the first mobile station can be programmed so that, in response to detecting that the first user is likely to soon instruct the first mobile station to send a user-generated reply to the to the second mobile station, the first mobile station sends a signal to the second mobile station, causing the second mobile station to acquire or maintain a radio link to the wireless communication network. For example, on an SMS-enabled first mobile station, once a "REPLY" button-press trigger event has occurred but before the user sends a responsive message, the first mobile station may send a reservation message to the second mobile station through the wireless communication network. The reservation message could be a SMS message to the second mobile station, and the message could cause the second mobile station to originate a packet-data connection (i.e., to acquire a radio link). The SMS message would preferably be invisible to the users of both the first mobile station and the second mobile station. This process could also cause a second mobile station that is in an idle state, and not just dormant, to acquire a radio link and data link. Further, the SMS message could alternatively or additionally cause the second mobile station to not go dormant and to instead maintain any current and active packet-data connection. Additionally, the SMS message could instruct the second mobile station to maintain the radio link for at least a fixed period of time. Alternatively or additionally, the first mobile station could send an industry standard PING to the second mobile station, as described above.

As another example, in response to receipt of a reservation message from a first mobile station, the communication server could cause a specially-coded voice-call initiation message to be sent to the terminating switch (i.e., the switch through which the second mobile station would normally establish a radio link). The terminating switch may respond to the specially coded voice-call initiation message by paging the second mobile station with a coded page message that causes the second mobile station to originate a packet-data connection or to not go dormant. For instance, the terminating switch can respond to the specially coded voice-call initiation message as it would respond to a packet data communication that has arrived from the network for transmission over a radio link to the second mobile station. Namely, the terminating switch could responsively alert (e.g., page) the second mobile station to cause the second mobile station to acquire a radio link over which it could receive packet data.

Advantageously, in all cases, by sending a signal from the first mobile station that causes the second mobile station to initiate or maintain a radio link in response to an indication of an anticipated responsive message from the first mobile station, rather than waiting until the first mobile station actually sends the responsive message, the communication delay resulting from dormancy of the second mobile station can be greatly reduced or avoided. Preferably, the second mobile station will be fully awakened (or will at least have begun the process of acquiring a radio link) by the time the responsive message arrives at the terminating switch, so there would be no need to then begin awakening the second mobile station in order to send the responsive message from the terminating switch to the second mobile station.

These and other aspects, advantages, and alternatives of the exemplary embodiment will become apparent to those of ordinary skill in the art by reading the following detailed description, with reference where appropriate to the accompanying drawings.

BRIEF DESCRIPTION OF THE DRAWINGS

Exemplary embodiments of the present invention are described herein with reference to the drawings, in which.

DETAILED DESCRIPTION

1. Communication System

Figure 1:
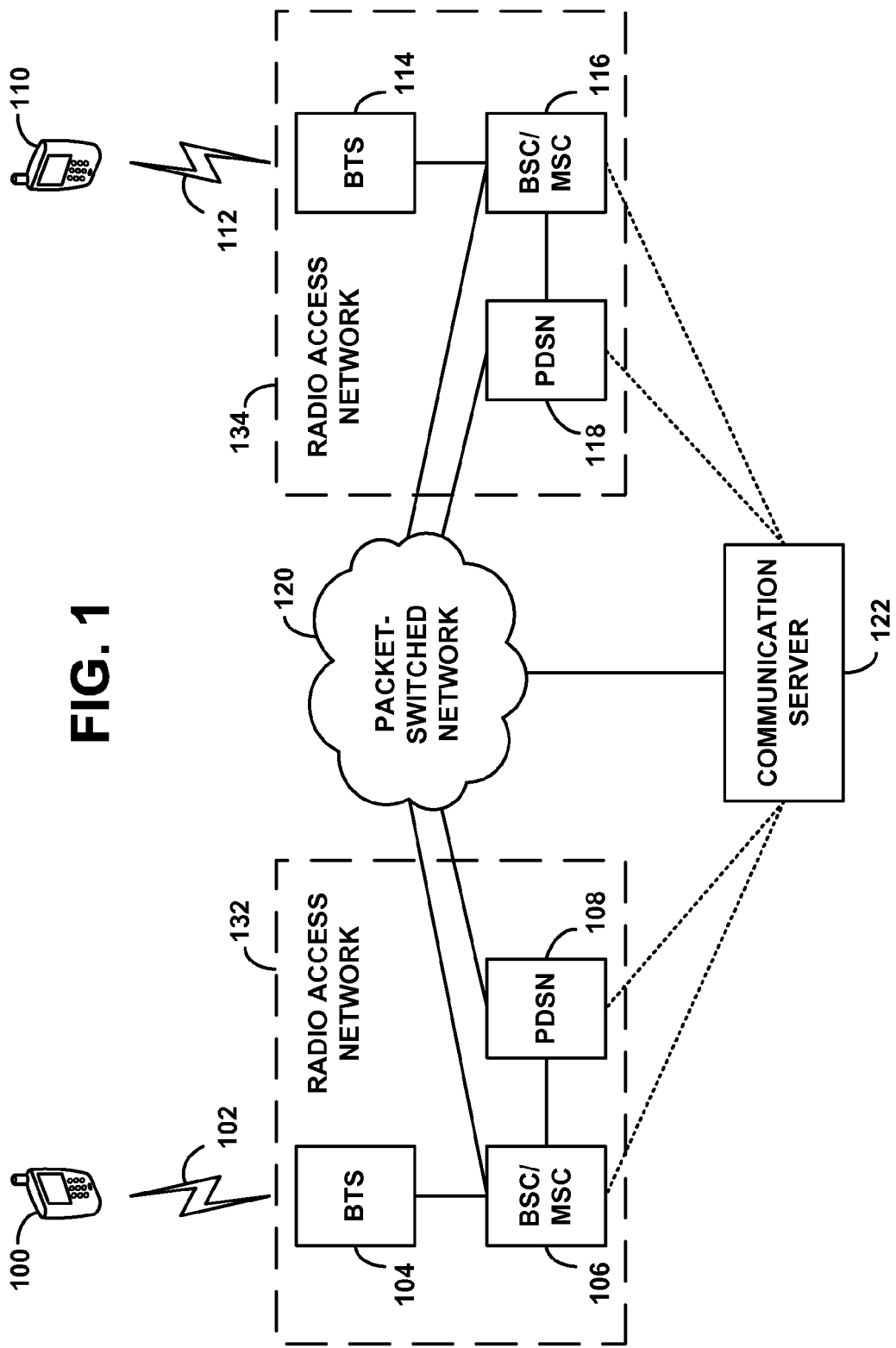
FIG. 1 is a block diagram illustrating a system in which exemplary embodiments can be implemented.

Referring to the drawings, FIG. 1 depicts an example communication system in which an exemplary embodiment of the present invention may be employed. It should be understood, however, that this and other arrangements and processes described herein are set forth for purposes of example only, and other arrangements and elements (e.g., machines, interfaces, functions, orders of elements, etc.) can be added or used instead, some elements may be omitted altogether, and some functions may occur across multiple elements. Further, as in most telecommunications applications, those skilled in the art will appreciate that many of the elements described herein are functional entities that may be implemented as discrete components or in conjunction with other components, in any suitable combination and location.

Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

As depicted in FIG. 1, the exemplary system may include a plurality of mobile stations, such as mobile stations 100 and 110, for example. (Note that the term "mobile station" is used here by convention to refer to a wireless communication terminal. In practice, the wireless communication terminal could actually be mobile, such as a traditional cellular phone, or it could be a fixed wireless terminal, such as a wirelessly connected pay phone for instance.)

Each mobile station (MS) can be linked with a packet network (e.g., an IP network) 120 through a radio access network. As shown by way of example, MS 100 is linked with packet network 120 through a first radio access network 132. Likewise, MS 110 is linked with packet network 120 through a second radio access network 134. In an alternative network arrangement, both MS 100 and MS 110 can be linked to packet network 120 by a common radio access network, or networks 132 and 134 might be subparts of a common wireless carrier's network. Other alternative arrangements are possible as well.

Each radio access network 132 and 134 provides wireless connectivity with packet network 120 and can take any of a variety of forms. By way of example, radio access network 132 may include a BTS 104 that radiates to define an air interface 102 through which MS 100 can communicate. BTS 104 may then be coupled with a BSC/MSC 106, which may in turn be coupled through a PDSN 108 or another gateway to packet network 120. Conventionally, MS 100 can acquire a radio link over air interface 102 to communicate with BSC/MSC 106 and in turn with other entities via packet network 120. Further, as shown, BSC/MSC 106 may have a more direct connection to packet network 120, so that BSC/MSC 106 can itself engage in packet data communications over the packet network, and/or so that BSC/MSC 106 can facilitate more end-to-end packet-data communications with MS 100.

Similarly, radio access network 134 may include a BTS 114 that radiates to define an air interface 112 through which MS 110 can communicate. BTS 114 may then be coupled with a BSC/MSC 116, which may in turn be coupled through a PDSN 118 or another gateway to packet network 120. Conventionally, MS 110 can acquire a radio link over air interface 112 to communicate with BSC/MSC 116 and in turn with other entities via packet network 120. Further, as shown, BSC/MSC 116 may have a more direct connection to packet network 120, so that BSC/MSC 116 can itself engage in packet data communications over the packet network, and/or so that BSC/MSC 116 can facilitate more end-to-end packet-data communications with MS 110.

In exemplary operation, each MS in FIG. 1 can engage in packet-data communication over packet network 120 after acquiring a radio link over an air interface and a data link with a PDSN or other gateway. As described generally above, for instance, an MS such as MS 100 may send an origination message to a base station such as BTS 104, asking for a radio link for packet-data communication, and BSC/MSC 106 may responsively instruct MS 100 to operate on a given traffic channel over air interface 102. Through that traffic channel, MS 100 may then negotiate with a gateway such as PDSN 108 to establish a data link such as a PPP session. Further, the gateway and/or some other entity such as a mobile-IP home agent or AAA server (not shown) could assign an IP address to MS 100 for use in communicating over packet network 120. More specifics of this conventional operation are described, by way of example, in 3GPP2 and later specifications with which those of ordinary skill in the art are familiar.

In each of these exemplary radio access networks, the functional elements sometimes referred to as BSC and MSC are shown combined into a single entity, referred to as BSC/MSC. It should be understood that these respective functional elements could instead reside as discrete entities in their respective radio access networks. Those of ordinary skill in the art are well aware of the arrangement and operation of typical BSC and MSC functions. Additionally, other entities, not shown, might reside on or be accessible via the packet network 120 as well. Further, depending on the air interface protocol and other factors, network elements of different names and different functions could be implemented instead.

A communication server 122 that directs, controls, and/or facilitates communications between mobile stations may reside on the packet network 120. The communication server 122 may comprise or be directly coupled with BSC/MSC 106, BSC/MSC 116, PDSN 108, and/or PDSN 118, or it may be a discrete element on the network 120. If the communication server 122 comprises a BSC/MSC, such as BSC/MSC 106, then other communication servers (not shown) may respectively comprise other BSC/MSCs, such as BSC/MSC 116. Alternatively or additionally, the communication server 122 may comprise a short messaging service center (SMSC). As defined by TIA/EIA 637-A and/or other industry standards, the SMSC can receive, store and forward short messaging service (SMS) messages to short messaging entities, such as an SMS-capable mobile station for instance. MS 100 and MS 110, in the exemplary arrangement, can be SMS-capable mobile stations.

Figure 2:
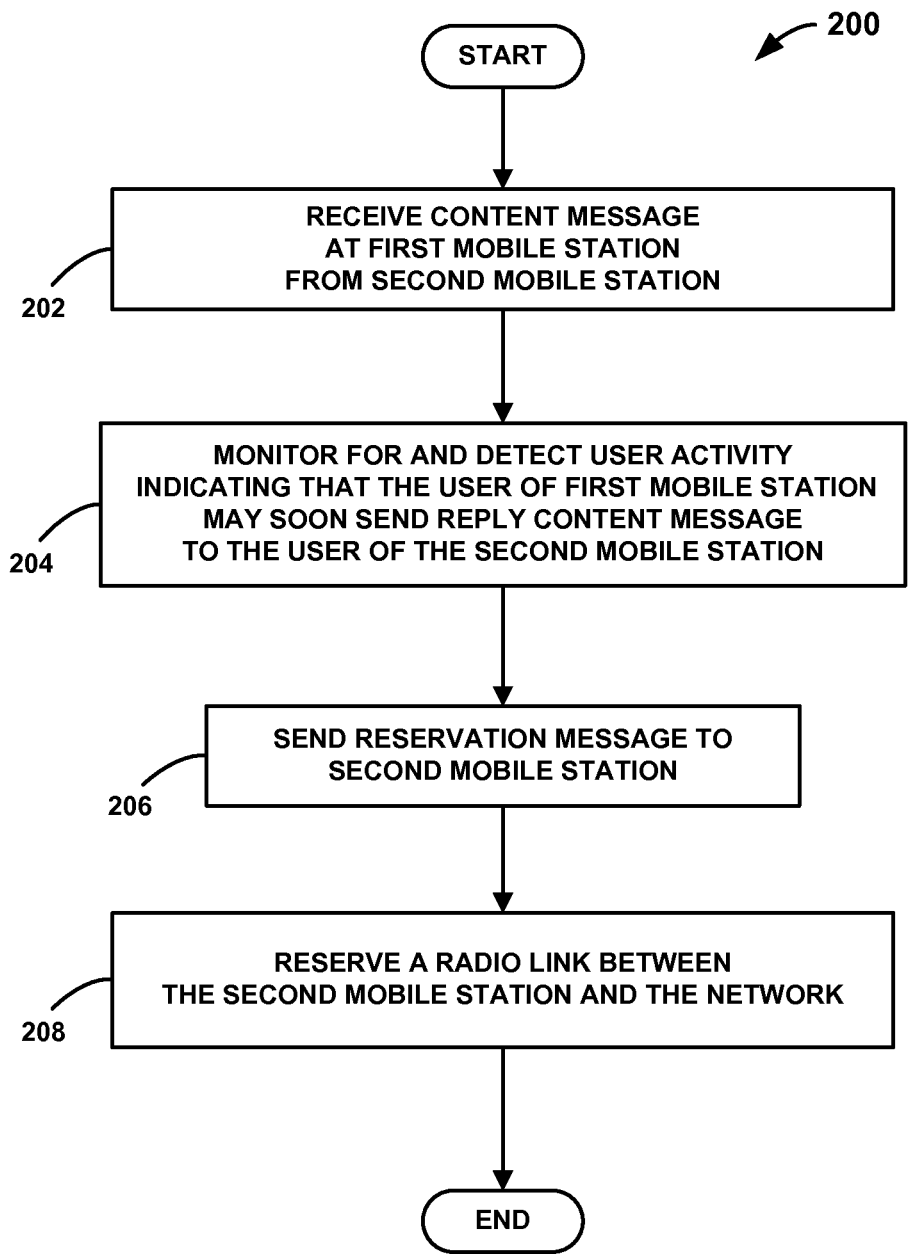
FIG. 2 is a flowchart illustrating a process carried out in accordance with an exemplary embodiment.

Referring next to FIG. 2, a flow chart 200 is provided to generally illustrate functions that can be involved in carrying out an exemplary embodiment. At block 202, a first mobile station, such as MS 100 in FIG. 1, may receive a message from a second mobile station, such as MS 110. The message may contain content which is displayed to the user of MS 100. For example, the message may be an SMS message generated by the user of MS 110. At block 204, MS 100 may monitor user interaction with MS 100 in order to detect an activity that indicates that the user of the first mobile station is likely to soon instruct the first mobile station to send a user-generated reply to the previously received message. For example, after receiving the message at the first mobile station, the user of MS 100 may read the message on a display interface of MS 100 and decide to reply to the message. To begin composing a reply message, the user of MS 100 may need to take an affirmative action, such as pressing a "REPLY" button on a user interface or using a voice command to instruct MS 100 to activate a user-input mode that allows the user to begin composing the reply message. Alternatively, on some SMS message handler programs, the user of MS 100 may, upon viewing the received SMS message, immediately begin typing the reply. Other examples are possible as well. At block 204, MS 100 may detect this affirmative action (e.g., pressing "REPLY," sending the relevant voice command, typing a reply directly) of the user acting to reply to the message from MS 110.

At block 206, in response to detecting the affirmative action, MS 100 may then send through the network a reservation message to MS 110 so as to ultimately (with or without intervening operations in the network) cause MS 110, at block 208, to either maintain an active radio connection to the network or to begin waking up if it has gone dormant. For example, the reservation message may be a SMS message that causes MS 110 to originate or accept a new radio link to the network, or to maintain an existing radio link to the network. Preferably, MS 100 would send the reservation message silently, so that the reservation message would be invisible to the users of both MS 100 and MS 110; i.e., conventional users would not be aware that a reservation message had been sent or received. Alternatively, the reservation message could be a ping request, which would also preferably be invisible to the users of both MS 100 and MS 110.

Additionally, the reservation message may cause the second radio link to the second mobile station to be maintained for a fixed period of time, or for at least a fixed period of time. For example, the reservation message may contain data instructing the second mobile station to maintain its radio link for at least a fixed period of time, e.g., 45 seconds. Alternatively, the reservation message may contain data instructing a network entity through which the message travels, such as an MSC or BSC, to maintain the radio link for at a fixed period of time.

Figure 3:
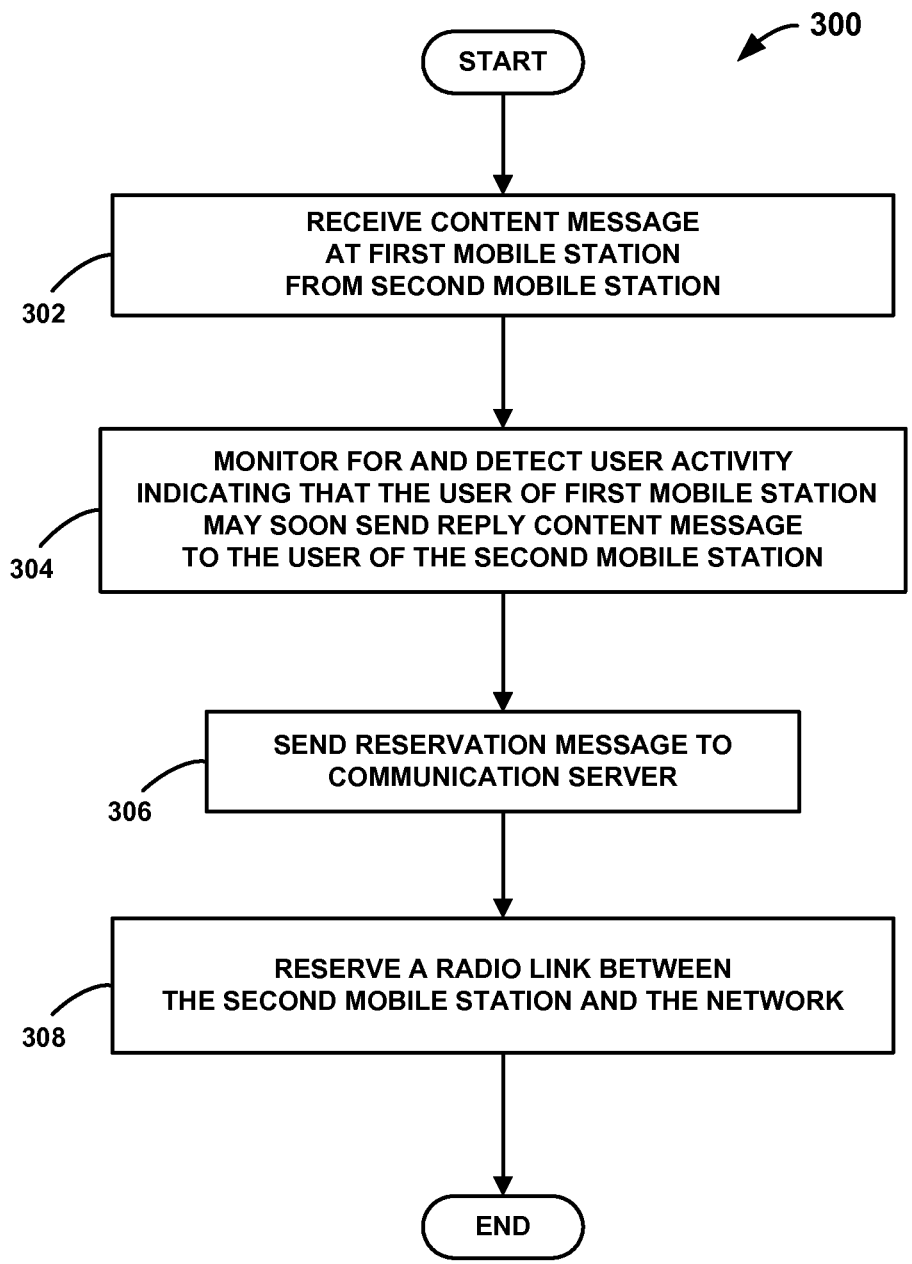
FIG. 3 is a flowchart illustrating a process carried out in accordance with an exemplary embodiment.

FIG. 3 shows a flow chart 300 that also generally illustrates functions that can be involved in carrying out an exemplary embodiment. At block 302, a first mobile station, such as MS 100 in FIG. 1, may receive a message from a second mobile station, such as MS 110. The message may contain content which is displayed to the user of MS 100. For example, the message may be an SMS message generated by the user of MS 110. At block 304, MS 100 may monitor user interaction with MS 100 in order to detect an activity that indicates that the user of the first mobile station is likely to soon instruct the first mobile station to send a user-generated reply to the previously received message. For example, after receiving the message at the first mobile station, the user of MS 100 may read the message on a display interface of MS 100 and decide to reply to the message. To begin composing a reply message, the user of MS 100 may need to take an affirmative action, such as pressing a "REPLY" button on a user interface or using a voice command to instruct MS 100 to activate a user-input mode that allows the user to begin composing the reply message. Alternatively, on some SMS message handler programs, the user of MS 100 may, upon viewing the received SMS message, immediately begin typing the reply. Other examples are possible as well. At block 304, MS 100 may detect this affirmative action (e.g., pressing "REPLY," sending the relevant voice command, typing a reply directly) of the user acting to reply to the message from MS 110.

At block 306, MS 100 may then, in response to detecting the affirmative action, send through the network a reservation message to a communication server that is communicatively coupled to MS 100, such as communication server 122. The reservation message would preferably contain identification information, such as an identifier of MS 110, an identifier of a user of MS 110, or some other information that could ultimately be used to contact MS 110. For example, the identifier may be a mobile identification number (MIN), a mobile directory number (MDN), or a network access identifier (NAI).

At block 308, the communication server 122 may, alone or in conjunction with other elements on the network, reserve a radio link for MS 110, in anticipation of future data communications from MS 100 to MS 110 through the network. For example, if MS 110 is dormant, the communication server 122 may send generic data, like an industry standard ping request, over packet network 120 to MS 110. To facilitate sending the ping request to MS 110, BSC/MSC 116 may then conventionally page MS 110 and thereby cause MS 110 to request a radio link over which to receive the data.

Alternatively or additionally, if MS 110 currently has an active radio link with the network, the communication server 122 may deny, or cause to be denied, future tear-down requests in which the MS 110 or another network entity attempts to disable the current active radio link. For example, communication server 122 may instruct and/or cause BSC/MSC 116 to keep a traffic channel assigned to MS 110, regardless of any conventional requests to release the traffic channel. Preferably, if the communication server 122 denies tear-down requests, or causes them to be denied, it would only be for a limited period of time, so as to eventually allow the active radio link to be released at some future time. For example, if communication server 122 is distinct from the BSC/MSC 116 serving MS 110, then communication server 122 could instruct BSC/MSC 116 to ignore and not issue for a fixed period of time any release orders regarding the traffic channel on which MS 110 may be operating.

As still another example, if communication server 122 is distinct from BSC/MSC 116, communication server 122 could send a specially-coded voice-call setup message, such as an ISDN User Part (ISUP) Initial Address Message (IAM) to BSC/MSC 116. Normally, an IAM would be used to set up a voice call. However, in accordance with the exemplary embodiment, the IAM could include a special code that BSC/MSC 116 may be programmed to detect and respond to in a new way. In particular, BSC/MSC 116 may respond to the special code in the IAM by treating the IAM as though it were an incoming data communication for MS 110. Thus, the BSC/MSC 116 could responsively page MS 110 and cause MS 110 to request and acquire a radio link, optimally without causing MS 110 to ring, as would normally occur with voice call setup.

As yet another example, communication server 122 could send, or cause to be sent, an SMS message to MS 110. For example, this could be a WAP Push type message. The SMS message may cause MS 110 to originate, accept, or maintain an existing radio link to the network. Preferably, MS 110 would receive the SMS message silently, so that the SMS message would be invisible to the user of MS 110; i.e., a conventional user would not be aware that the SMS message had been received.

Figure 4:
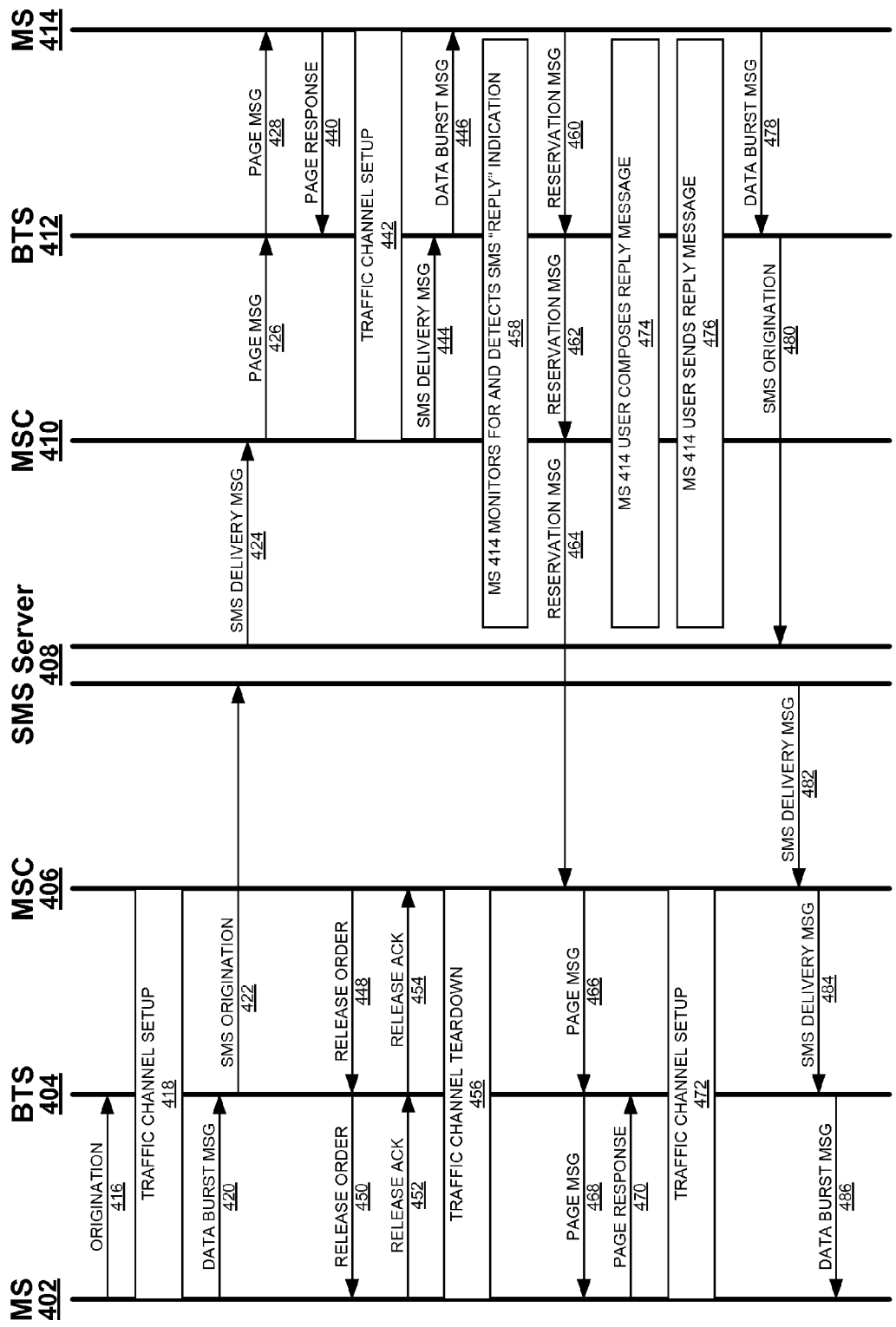
FIG. 4 is an exemplary message flow diagram illustrating an embodiment of the invention.

FIG. 4 depicts a representative message flow diagram that illustrates functions that can be involved in carrying out an exemplary embodiment using SMS messaging as an example. In FIG. 4, MS 402 may be considered the second mobile station according to previous nomenclature, i.e., the mobile station that sends the original message to which the first mobile station, or MS 414, responds. Also, some messages and actions that would conventionally occur in a messaging scenario as described in relation to FIG. 4 are not illustrated in the figure. For example, certain acknowledgement and confirmatory response messages, such as data burst acknowledgement messages, may occur in response to received messages, but are not shown in FIG. 4. The specifics of such messages in relation to SMS messaging operations are known to those of ordinary skill in the art and do not need to be detailed in FIG. 4 in order understand the embodiment. Further, one or more BSCs are not specifically shown in FIG. 4, but any of BTS 404, MSC 406, MSC 410, and/or BTS 412 may include or be coupled with a BSC.

In the SMS messaging embodiment illustrated in FIG. 4, the user of MS 402 may send an SMS message to MS 414. When that occurs, MS 402 may send an origination message 416 to the BTS 404 that radiates the air interface under which MS 402 is operating. In response to the origination message 416, MS 402 and MSC 406 may work cooperatively, as shown by block 418, to set up a radio link layer connection by assigning MS 402 to operate on a particular traffic channel over the air interface of BTS 404. Other network elements may also participate in the traffic channel setup; for example, a PDSN (not shown) may be consulted to assign an IP address to MS 402.

After the radio link is set up, MS 402 may then send an SMS message in a data burst message 420, which may be forwarded as an SMS origination message 422 to SMS Server 408. SMS Server 408 may then send an SMS delivery message 424 based on the SMS origination message 422 to MSC 410, which controls BTS 412, which in turn radiates the air interface under which MS 414 operates. MSC 410 may then page MS 414 via the BTS 412, by means of page messages 426 and 428. Once MS 414 responds to page message 428 with page response 440, MS 414 and MSC 410 may work cooperatively to set up a radio link connection by assigning MS 414 to operate on a particular traffic channel over the air interface of BTS 412. Other network elements may also participate in the traffic channel setup; for example, a PDSN (not shown) may be consulted to assign an IP address to MS 414. Once the traffic channel is set up, MSC 410 may then deliver the SMS message to MS 414 via BTS 412, by means of SMS delivery message 444 and data burst message 446.

Before, during, or after final delivery of the SMS message to MS 414, MS 402 and the radio network under which it operates may disconnect their active radio link connection in order to conserve network and/or mobile station resources. For example, after a certain time-out period has elapsed without further communication from MS 402, MSC 406 may send a release order to MS 402 via BTS 404 and by means of release order messages 448 and 450. MS 402 may then acknowledge the release order by sending a release acknowledgement back to the MSC by means of messages 452 and 454. At that point, the traffic channel would be torn down, as shown by block 456. Alternatively, and not shown, MS 402 may initiate the tear down by sending a release order message to MSC 406 and MSC 406 may respond with an acknowledgement and a subsequent tear down of the traffic channel connection.

Returning now to events at MS 414, MS 414 may monitor user interaction with MS 414 in order to detect an intent by the user of MS 414 to reply to the SMS message previously received via data burst message 446, as shown by block 458. For example, after receipt of the SMS message, the user of MS 414 may read the SMS message on a display interface of MS 414 and decide to reply to the SMS message. To begin composing the reply SMS message, the user of MS 414 will have to take an affirmative action, such as pressing a "REPLY" button on a user interface of an SMS message handler program present on MS 414 or by using a voice command to instruct MS 414 to activate a user-input mode in the SMS message handler program, either of which may allow the user to begin composing the reply message. Alternatively, on some SMS message handler programs, the user of MS 414 may, upon viewing the received SMS message, immediately begin typing the reply directly. Other examples are possible as well.

MS 414 may then detect the affirmative action (e.g., pressing "REPLY," sending the relevant voice command, typing a reply directly, etc.) of the user acting to reply to the message received from MS 402. For example, MS 414 may be programmed to monitor the button-press event in the SMS message handler program and, upon capturing a button-press event, to then take actions as described below.

Once MS 414 detects its user's intent to reply, MS 414 may send a reservation message in order to predictively reserve a radio link for MS 402. MS 414 may send the reservation message 460 to BTS 412, which may then forward the message as reservation message 462 to MSC 410. In the embodiment illustrated by FIG. 4, MSC 410 could serve the role of a communication server 122. MSC 410, alone or in conjunction with other network elements not shown, may determine that MSC 406 controls BTS 404 through which MS 402 operates and therefore MSC 410 may forward the reservation message as reservation message 464 to MSC 406. Assuming, in this example, that MS 402 has gone dormant (i.e., its traffic channel connection has been torn down, as shown by block 456), MSC 406 may then page MS 402 in order to restore an active radio link. MSC 406 may send a page message 466 to BTS 404, which will actively page MS 402 with page message 468. Once MS 414 responds with page response 470, MS 402 and MSC 406 may work cooperatively, as shown by block 472, to re-set up a radio link layer connection by assigning MS 402 to operate on a particular traffic channel over the air interface of BTS 404. Other network elements (not shown) may also participate in the traffic channel setup.

At the same time or after MS 402 is paged and its traffic channel is set up, the user of MS 414 may be composing the SMS reply message, as represented by block 474. Once the user has finished composing the reply message, the user may affirmatively act to send the reply message to MS 402 (e.g., the user may press a "SEND" button). MS 414 may then send a data burst message 478 containing the SMS reply message to BTS 412, which may then forward the SMS replay message to SMS server 408 in SMS origination message 480. SMS Server may then deliver the SMS reply message to MS 402 via MSC 406 and BTS 404 by means of SMS delivery messages 482 and 484 and data burst message 486. Because an active radio link has already been set up with MS 402, as shown at block 472, the SMS reply message should be delivered with very low latency as compared to conventional operation in which the traffic channel was previously torn down and MS 402 would have been dormant when the SMS reply message came in.

2. Exemplary Mobile Stations

Figure 5:
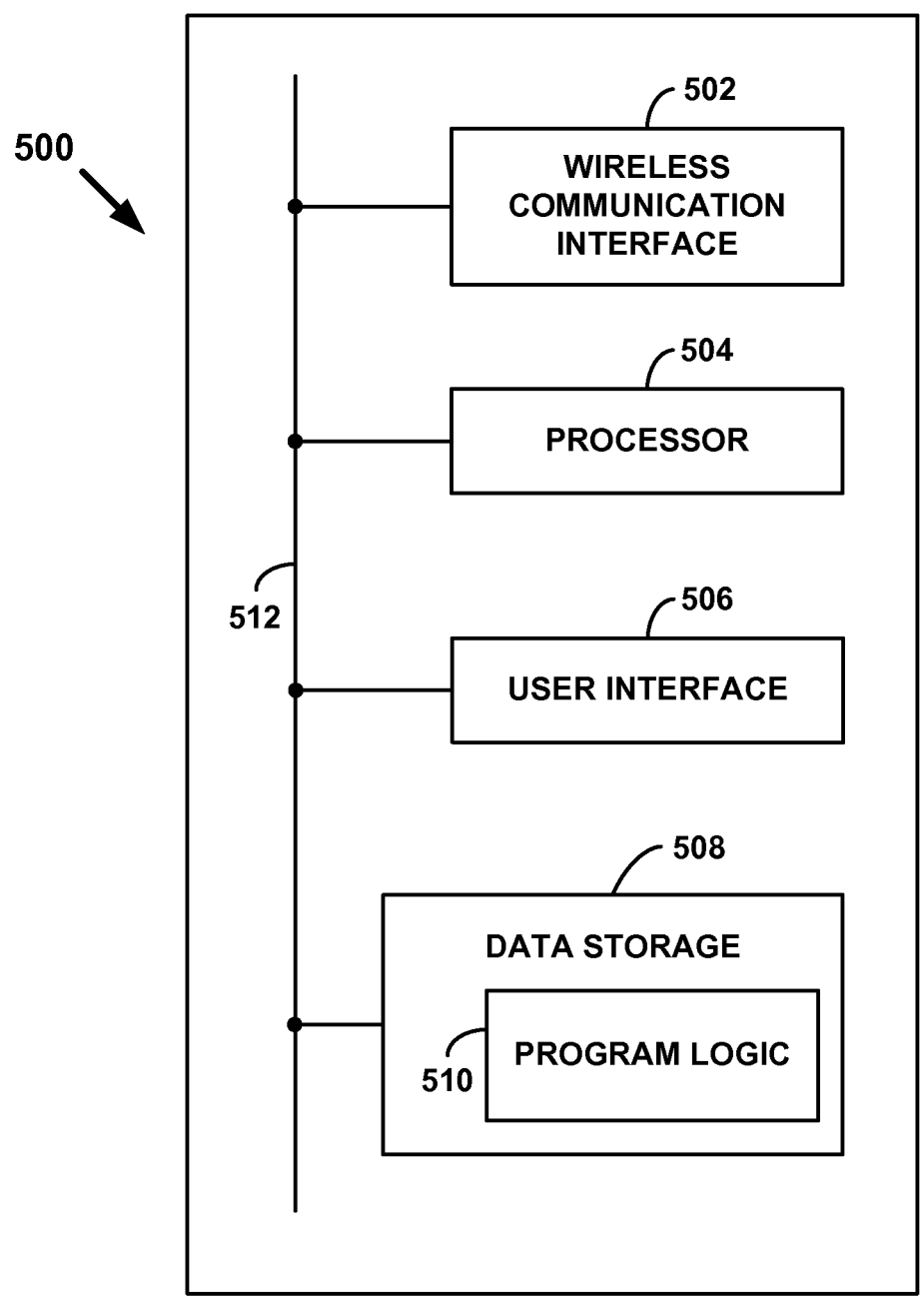
FIG. 5 is a block diagram depicting an exemplary mobile station.

The mobile stations described herein may be data-capable terminals of any suitable form, and may be the same as or different than each other. To help illustrate, FIG. 5 is a simplified block diagram depicting an exemplary MS 500. As shown in FIG. 5, the exemplary MS 500 includes a processor (i.e., one or more processors) 504, data storage 508, a user interface 506, and a wireless communication interface 502, all of which may be coupled together by a system bus, network, or other connection mechanism 512.

Each component of the exemplary MS 500 can take various forms. For instance, processor 504 may be an Intel® x86 standard or mobile class processor, or a digital signal processor (which may integrate part or all of data storage 508). Data storage 508 may be flash memory and/or a storage drive.

User interface 506 may provide means for interaction with a user. As such, the user interface may include touch and voice input and media output mechanisms. The user interface may include a display, speaker or other mechanism (not shown) for presenting information to a user, as well as an input mechanism (e.g., keyboard, keypad, microphone, mouse, and/or touch-sensitive display overlay) (not shown) for receiving input from a user.

Wireless communication interface 502 may facilitate communication over an air interface with a respective base station. As such, the wireless communication interface 502 may include an antenna for sending and receiving radio-frequency signals over the air interface. Wireless communication interface 502 may also include a protocol-dependent chipset (not shown), which may facilitate encoding, transmission and decoding of communication signals according to a wireless protocol used by the mobile station. The chipset may also enable the mobile station to enter into idle, dormant, and active wireless communication states.

The manner in which MS 500 establishes and carries out data communication might vary depending on the protocol used for communication over the air interface. In the exemplary embodiment, for instance, the air interface could be a code division multiple access (CDMA) air interface, as set forth in an industry standard such as EIA/TIA/IS-2000a ("IS-2000") and revisions thereof. It should be understood, however, the air interface could take other forms as well, including CDMA (e.g., 1xRTT, 1xEV-DO), iDEN, WiMAX (e.g., IEEE 802.16), LTE, TDMA, AMPS, GSM, UMTS, or EDGE, Wi-Fi (e.g., IEEE 802.11), or BLUETOOTH, as is well know in the art.

Data storage 508 may hold a set of program logic 510 (e.g., machine language instructions and reference data) applicable by processor 504 to carry out various functions described herein. Alternatively, various functions could be carried out by additional hardware and/or firmware not shown. The logic 510 may cause processor 504 to carry out certain functions automatically (for example, to establish a radio link and/or a data link upon mobile station power up) without any signaling input from a user, and to carry out the same or other functions in response to user requests, network messages, or other triggering events. According to the logic 510, the processor 504 may receive user input from user interface 506 and respond accordingly. For examples, in response to user actuation of a "REPLY" button (or another input mechanism designated to indicate a responsive user message is likely to soon be sent), the processor may cause the wireless communication interface 502 to send a reservation message or other signal into the network, as described above in various embodiments.

In accordance with an embodiment, the logic 510 in data storage 508 may also define a message-handler application executable by the processor 504 to recognize reservation messages and to responsively maintain a current radio link with the network or to set up a new radio link, such as by sending an origination message as described above. This way, MS 500 could receive a reservation message sent from a remote MS or from a remote BSC/MSC and MS 500 could begin waking up. The logic 510 may also contain an application executable by the processor 504 to invisibly receive and send reservation messages, particularly SMS reservation messages. In this way, MS 500 could use conventional SMS signaling, but special codes within the SMS messages could be used to define the messages as invisible to the user.

2. Exemplary Communication Server

Figure 6:
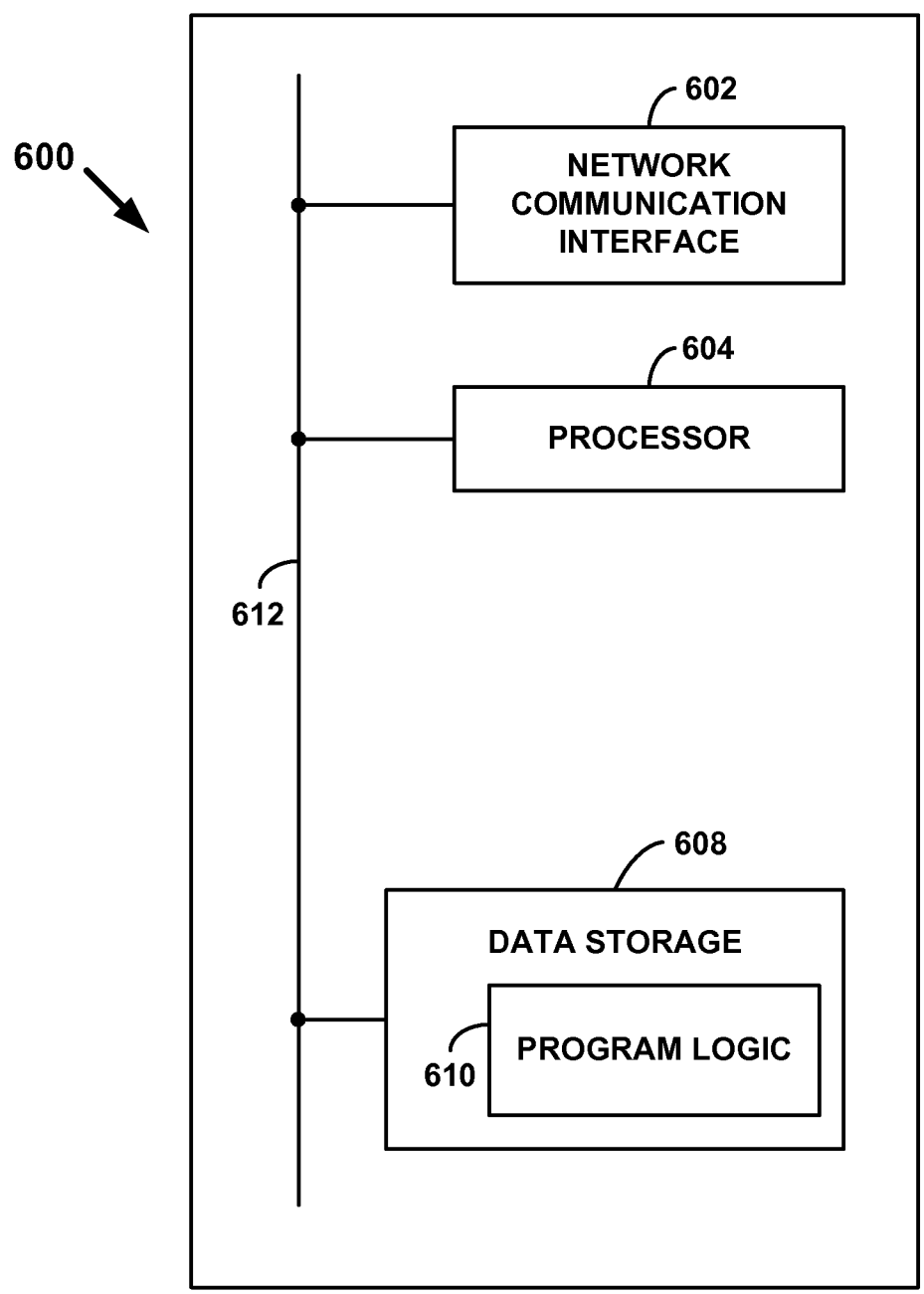
FIG. 6 is a block diagram depicting an exemplary communication server.

FIG. 6 is a simplified block diagram depicting an example BSC/MSC suitable for use in accordance with the exemplary embodiment. As shown in FIG. 5, the exemplary BSC/MSC includes a processor (i.e., one or more processors) 604, data storage 608, and a network communication interface 602, all of which may be coupled together by a system bus, network or other connection mechanism 612.

Each component of the exemplary communication server 600 can take various forms. For instance, processor 604 may be an Intel® x86 class processor or a digital signal processor (which may integrate part or all of data storage 608). Data storage 608 may be flash memory and/or a storage drive.

Network communication interface 602 may facilitate communication over a variety of interfaces, depending on the location and additional functionality of the communication server 600. For example, if the communication server 600 comprises a BSC/MSC, the interface 602 may include air and landline communication functionality. It may also include a protocol-dependent chipset (not shown), which may facilitate encoding, transmission and decoding of communication signals according to wireless protocols used by mobile stations served by the BSC/MSC. The interface 602 may also include functionality to enable communications over a packet-network and communications with a PDSN, as well as communications with other elements in the network.

Data storage 608 may hold a set of program logic 610 (e.g., machine language instructions and reference data) applicable by processor 604 to carry out various functions described herein. Alternatively, various functions could be carried out by additional hardware and/or firmware not shown. The logic 610 may cause processor 604 to carry out certain functions automatically or in response to network messages or other triggering events. For example, and in accordance with an embodiment, the logic 610 may define a message-handler application executable by the processor 604 to recognize reservation messages and to responsively set up or maintain, or cause other network elements to set up or maintain, communication links with mobile stations identified by the reservation messages.

Exemplary embodiments have been shown and described herein. Those of ordinary skill in the art will appreciate that numerous modifications from the embodiments described are possible, while remaining within the scope of the claims.

We claim:

1. A method comprising:
   receiving at a first mobile station over a first radio link serving the first mobile station a message sent from a second mobile station, wherein the message contains content intended for a user of the first mobile station;
   at the first mobile station, detecting activity indicative of an intent to instruct the first mobile station to send to the second mobile station a user-generated reply to the message; and
   in response to the detecting, the first mobile station sending a reservation message to the second mobile station, wherein the reservation message causes the second mobile station to reserve a second radio link over which the second mobile station is configured to receive the reply from the first mobile station, wherein reservation of the second radio link comprises:
      requesting a new radio link over which the second mobile station is configured to receive the reply from the first mobile station;
      setting up the new radio link; and
      maintaining the new radio link for a fixed period of time.

2. The method of claim 1, wherein detecting activity comprises the first mobile station detecting that the user of the first mobile station has begun to compose on the first mobile station the user-generated reply.

3. The method of claim 1, wherein the message comprises a first short message service (SMS) message and the reply comprises a second SMS message.

4. The method of claim 1, wherein reserving the second radio link comprises:
   maintaining an existing radio link over which the second mobile station is configured to receive the reply from the first mobile station.

5. The method of claim 1, wherein reserving the second radio link comprises:
   requesting a new radio link over which the second mobile station is configured to receive the reply from the first mobile station.

6. The method of claim 1, wherein the reservation message comprises a ping request.

7. The method of claim 1, wherein the reservation message comprises a short message service (SMS) message.

8. The method of claim 1, wherein the reservation message is not detectable by a user of the second mobile station.

9. A method comprising:
   receiving at a first mobile station over a first radio link serving the first mobile station a message sent from a second mobile station, wherein the message contains content intended for a user of the first mobile station;
   at the first mobile station, detecting activity indicative of an intent to instruct the first mobile station to send to the second mobile station a user-generated reply to the message;
   in response to the detected activity, the first mobile station sending a reservation message to a communication server communicatively coupled to the first mobile station; and
   in response to receiving the reservation message, the communication server reserving a second radio link over which the second mobile station is configured to receive the reply from the first mobile station, wherein reserving the second radio link comprises:
      requesting a new radio link over which the second mobile station is configured to receive the reply from the first mobile station;
      setting up the new radio link; and
      maintaining the new radio link for a fixed period of time.

10. The method of claim 9, wherein detecting activity comprises the first mobile station detecting that the user of the first mobile station has begun to compose on the first mobile station the user-generated reply.

11. The method of claim 9, wherein the message comprises a first short message service (SMS) message and the reply comprises a second SMS message.

12. The method of claim 9, wherein reserving the second radio link comprises:
   maintaining an existing radio link over which the second mobile station is configured to receive the reply from the first mobile station.

13. The method of claim 9, wherein reserving the second radio link comprises:
   maintaining for a fixed period of time an existing radio link over which the second mobile station is configured to receive the reply from the first mobile station.

14. The method of claim 9, wherein reserving the second radio link comprises:
   sending to a switch serving the second mobile station a specially coded voice-call initiation signal that causes the switch to responsively initiate a radio link over which the second mobile station is configured to receive the reply from the first mobile station.

15. The method of claim 9, wherein the reservation message includes an identifier of the second mobile station.

16. The method of claim 9, wherein the reservation message is not detectable by a user of the second mobile station.

17. A first mobile device operable on a radio access network, the mobile device comprising:
   a network interface providing connectivity with the radio access network;
   a user interface for presenting messages to a user of the first mobile device and accepting input from the user;
   a processor;
   data storage; and
   program instructions stored in the data storage and executable by the processor to carry out functions including:
      (i) receiving a message sent from the second mobile device over the radio access network, wherein the message contains content intended for a user of the first mobile device;
      (ii) detecting activity that the user of the first mobile device has begun composing a reply to a user of the second mobile device; and
      (iii) in response to the detected activity, sending a reservation message to a communication server communicatively coupled to the first mobile device, wherein the reservation message requests that the communication server reserve a radio link over which the second mobile device is configured to receive the reply from the first mobile station, wherein reservation of the radio link comprises:

requesting the radio link;
setting up the radio link; and
maintaining the radio link for a fixed period of time.

\* \* \* \* \*